(12) United States Patent
Wendling et al.

(10) Patent No.: US 10,467,830 B2
(45) Date of Patent: Nov. 5, 2019

(54) ELECTRONIC CREDENTIAL READER

(71) Applicants: Jean Hugues Wendling, Denver, CO (US); Daniel William Field, Broomfield, CO (US)

(72) Inventors: Jean Hugues Wendling, Denver, CO (US); Daniel William Field, Broomfield, CO (US)

( * ) Notice: Subject to any disclaimer, the term of this patent is extended or adjusted under 35 U.S.C. 154(b) by 137 days.

(21) Appl. No.: 15/729,890

(22) Filed: Oct. 11, 2017

(65) Prior Publication Data

US 2019/0108696 A1 Apr. 11, 2019

(51) Int. Cl.
*G06K 5/00* (2006.01)
*G07C 9/00* (2006.01)
*H04W 12/08* (2009.01)
*H04W 12/06* (2009.01)
*G06F 21/31* (2013.01)

(52) U.S. Cl.
CPC ......... *G07C 9/00007* (2013.01); *G06F 21/31* (2013.01); *G07C 9/00174* (2013.01); *H04W 12/06* (2013.01); *H04W 12/08* (2013.01)

(58) Field of Classification Search
CPC . G07C 9/00007; G07C 9/00174; G06F 21/31; H04W 12/06; H04W 12/08
USPC .............................. 235/382, 382.5, 375, 451
See application file for complete search history.

(56) References Cited

U.S. PATENT DOCUMENTS

2007/0057057 A1* 3/2007 Andresky ............ G06K 7/0008
235/451

\* cited by examiner

*Primary Examiner* — Karl D Frech
(74) *Attorney, Agent, or Firm* — Daniel M. Cohn; Howard M. Cohn

(57) ABSTRACT

Disclosed embodiments provide a configurable electronic credential reader. The electronic credential reader defaults to a first communication mode utilizing a unidirectional communication interface. A bidirectional communication interface is monitored. If data is detected on the bidirectional communication interface, the electronic credential reader switches to a bidirectional communication mode. Circuitry within the electronic credential reader switches between the unidirectional communication interface and bidirectional communication interface such that the same external communication lines are used for both the unidirectional mode and the bidirectional mode.

20 Claims, 5 Drawing Sheets

ELECTRONIC CREDENTIAL READER

TECHNICAL FIELD

The present invention relates generally to access control for building entrances, and more particularly, to an electronic credential reader.

BACKGROUND

In the legacy architecture typically found in electronic access control, there is a credential reader mounted at an access point or door. When a user presents a credential to the reader and the credential is read, the credential reader sends the credential data to an access controller mounted somewhere on the premises behind the secure side of the door. The access controller then compares the data received from the electronic credential reader with a database of valid access credentials. If the credential is determined to have valid access privileges the controller energizes a relay that momentarily enables the unlocking mechanism of the door.

In early systems, the communication between the credential and reader contained no security measures at all. This made the credential data transmitted by the credential reader a point of vulnerability for the system, prone to interception by malicious actors. There are millions of electronic credential readers in use today at various commercial, industrial, military, and other institutions. It is therefore desirable to have improvements in electronic access control.

SUMMARY

In one aspect, there is provided an electronic credential reader, comprising: a credential receiver; a unidirectional communication interface; a bidirectional communication interface; a plurality of external communication lines, wherein the unidirectional communication interface, bidirectional interface, and external communication lines are coupled to a processor; a computer readable medium coupled to the processor; wherein the bidirectional communication interface and the unidirectional communication interface are configured to share the plurality of external communication lines, and; wherein the computer readable medium comprises instructions, that when executed by the processor, change a communication mode of the electronic credential reader from a unidirectional mode to a bidirectional mode.

In another aspect, there is provided an electronic credential reader, comprising: a credential receiver; a unidirectional communication interface; a bidirectional communication interface; a plurality of external communication lines; a switch coupled to the unidirectional communication interface, the bidirectional communication interface, and the plurality of external communication lines; a processor coupled to the switch; a computer readable medium coupled to the processor; wherein the bidirectional communication interface and the unidirectional communication interface are configured to share the plurality of external communication lines, and; wherein the computer readable medium comprises instructions, that when executed by the processor, change a communication mode of the electronic credential reader from a unidirectional mode to a bidirectional mode.

In yet another aspect, there is provided a computer-implemented method for configuring an electronic credential reader, comprising: initializing the electronic credential reader in a hunt mode; transmitting received credential information via a unidirectional communication interface while in hunt mode; monitoring a bidirectional communication interface for input data; and setting the electronic credential reader to a bidirectional mode upon detecting input data on the bidirectional communication interface.

In yet another aspect, there is provided a computer-readable medium containing instructions, that when executed by a processor, perform a method for configuring an electronic credential reader, comprising: initializing the electronic credential reader in a hunt mode; transmitting received credential information via a unidirectional communication interface while in hunt mode; monitoring a bidirectional communication interface for input data; and setting the electronic credential reader to a bidirectional mode upon detecting input data on the bidirectional communication interface.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

DETAILED DESCRIPTION

Disclosed embodiments provide a configurable electronic credential reader. The electronic credential reader defaults to a first communication mode utilizing a unidirectional communication interface. A bidirectional communication interface is monitored. If data is detected on the bidirectional communication interface, the electronic credential reader switches to a bidirectional communication mode. Circuitry within the electronic credential reader switches between the unidirectional communication interface and bidirectional communication interface such that the same external communication lines are used for both the unidirectional mode and the bidirectional mode.

The aforementioned functionality enables a smooth and convenient upgrade path for legacy access control equipment. Electronic credential readers communicate with an access controller to determine if a particular credential holder can be granted entry. This communication historically has been in an unsecure manner using a two-wire interface such as a Wiegand™ protocol. In recent years, this protocol has become susceptible to various forms of hacking and data breaches. To address this, newer, more secure protocols have been developed. Some of these protocols may utilize RS-485 at the lower level of communication. In order to utilize the newer protocol, both the credential reader and the access controller need to support the protocol. With embodiments of the present invention, configurable electronic credential readers can be installed in a premises and default to the legacy unidirectional communication protocol (e.g. Wiegand™). In the unidirectional mode, the electronic credential readers of disclosed embodiments can continue to communicate with a legacy access controller. When the legacy access controller is replaced with a new access controller capable of operating in a bidirectional communication protocol, the electronic credential readers can be configured to automatically detect the bidirectional communication protocol and switch to a bidirectional mode utilizing the same external communication lines as the legacy controller. In this way, no rewiring is necessary when switching from legacy, unsecured communication to a bidirectional protocol such as Open Supervised Device Protocol (OSDP). Thus, the reconfiguration is straightforward and can be performed with minimal operator/installer configuration.

Figure 1:
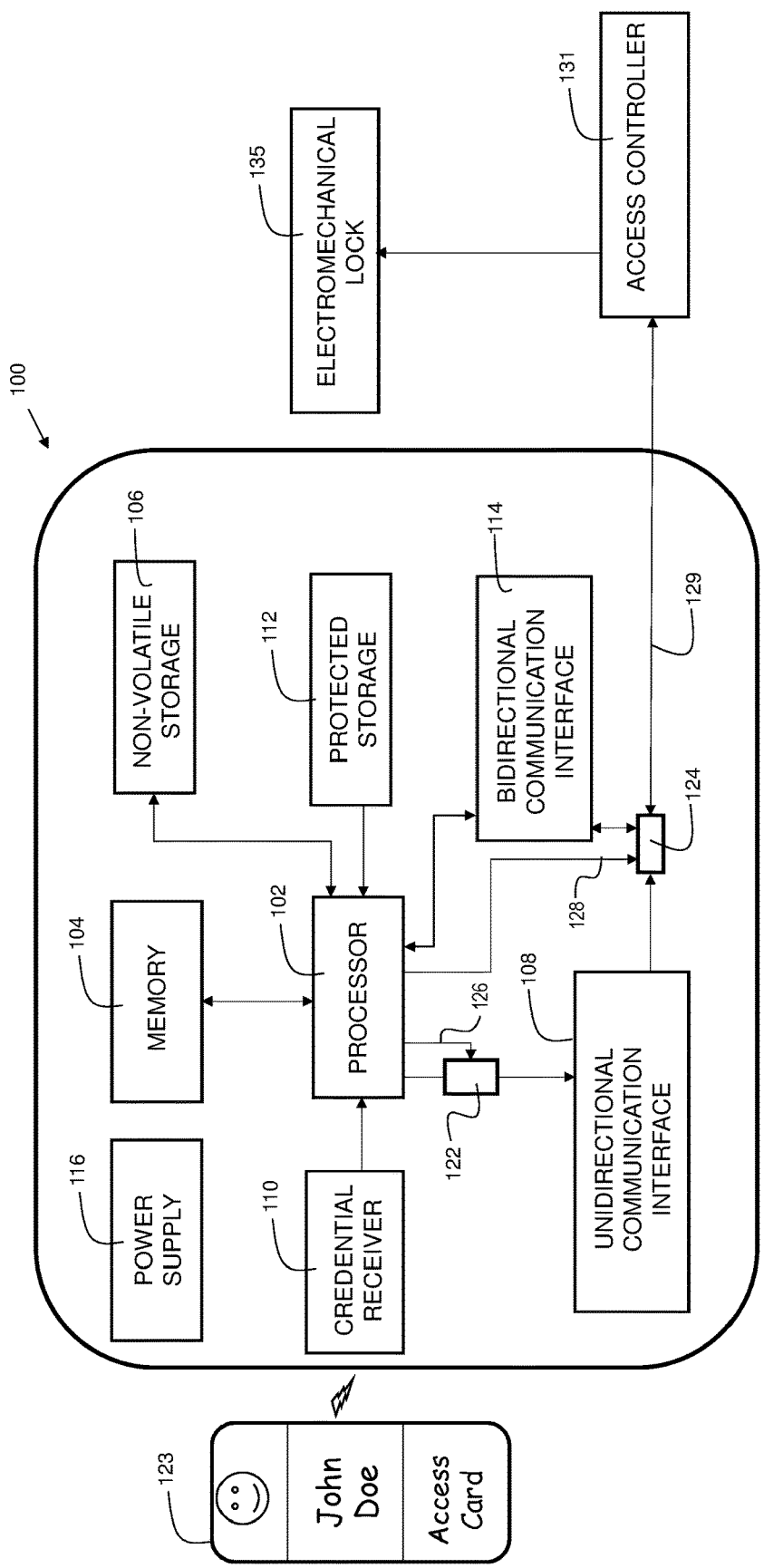
FIG. 1 is a block diagram of an electronic credential reader in accordance with embodiments of the present invention.

FIG. 1 is a block diagram of an electronic credential reader 100 in accordance with embodiments of the present invention. Electronic credential reader 100 comprises a processor 102. Memory 104 is coupled to processor 102. Memory 104 may be a non-transitory computer readable medium. Memory 104 can include, but is not limited to, flash memory, read-only memory (ROM), optical storage, magnetic storage, or other suitable storage technology. A non-volatile storage 106 is coupled to the processor 102. The non-volatile storage 106 can include battery-backed SRAM (static random-access memory), flash, magnetic storage, or other suitable storage technology. Power supply 116 provides power to the processor 102, storage elements such as memory 104, non-volatile storage 106, and protected storage 112, as well as other peripherals within the electronic credential reader 100. The power supply 116 may receive an alternating current (AC) source as an input and output a variety of positive and negative direct current (DC) voltages.

Electronic credential reader 100 includes a credential receiver 110. Credential receiver 110 can include, but is not limited to, a magnetic stripe reader, an optical reader, a near field communications (NFC) reader, or other suitable technology for reading a credential. The credential may be in the form of a card, shown as reference 123 in FIG. 1, a fob, wristband, smart phone, or other suitable technology for implementing a credential. Regardless of the type of credential, the electronic credential reader 100 transmits a credential received by the credential receiver to an access controller 131. The access controller 131 checks the received credential against a database or list of credentials and associated permissions. If the credential and permissions indicate entry is allowable, the access controller 131 temporarily unlocks electromechanical lock 135, allowing a user with the credential to pass through an entrance that is secured by the electromechanical lock 135.

The legacy communication between the electronic credential reader 100 and access controller 131 utilizes unidirectional communication interface 108. In embodiments, the unidirectional communication interface comprises an output interface. In embodiments, the unidirectional communication interface comprises a WIEGAND™ interface. The Wiegand interface has been a popular interface in the access control industry for years. While the implementation is widespread, the protocol is unsecure. Thus, even with secure communication between credential 123 and credential receiver 110, there still exists a vulnerability between electronic credential reader 100 and access controller 131. With the Wiegand protocol, eavesdropping of credential data is a simple matter for a malicious actor, allowing for cloning of credentials, and other security breaches.

To address the aforementioned vulnerability, newer communication protocols have arisen to facilitate communication between the electronic credential reader 100 and the access controller 131. These protocols include Open Supervised Device Protocol (OSDP). OSDP utilizes a bidirectional communication interface 114. In embodiments, the bidirectional communication interface is an RS-485 interface. The RS-485 interface enables bidirectional communication. In this way, utilizing the bidirectional communication interface 114, the electronic credential reader 100 can support advanced security features such as methods of implementing encryption, key management, and authentication on an OSDP connection. OSDP can support security features such as AES-128 encryption and Cipher-based Message Authentication Code (CMAC) chaining to improve overall security of the access control system for premises.

In order to support OSDP, both the electronic credential reader 100 and the access controller 131 must support the OSDP protocol. In a large premises, this can require many electronic credential readers and access controllers to be replaced. This can create a logistical complication for a premises as the access control system may need to be disabled for an extended period of time in order to accomplish this. However, with embodiments of the present invention, the electronic credential reader 100 can support both the legacy (Wiegand) communications and the OSDP (bidirectional communications) utilizing the same external communication lines. This feature greatly streamlines the conversion process from legacy to secure communications. For example, in a facility with legacy electronic credential readers and a legacy access controller, each credential reader can be replaced independently. The new electronic credential readers of disclosed embodiments continue to operate in legacy mode with the legacy access controller. Once all the new electronic credential readers including features of disclosed embodiments are installed, the access controller can be upgraded to one that supports OSDP. In embodiments, the electronic credential readers detect the OSDP protocol and switch to the secure OSDP mode. Since the electronic credential readers of disclosed embodiments use the same external communication lines for both the unidirectional (legacy) and bidirectional (secure) communications, transition from Wiegand to OSDP is seamless, with minimal disruption to the access control system.

Electronic credential reader 100 may further include protected storage 112. This may include a region of read-only memory that includes a unique identifier (UID) such as a MAC address, serial number, or other suitable identifier, as well as security certificates. This can enable secure communication between the access controller 131 and the electronic credential reader 100, including encrypted and/or digitally signed messages exchanged between the electronic credential reader 100 and the access controller 131 via external communication link 129.

Electronic credential reader 100 includes programmable switch 124 for each communication line. A programmable output signal 128 enables control of switch 124 from processor 102. In embodiments, the electronic credential reader 100 is initialized in a hunt mode. In hunt mode, the switch 124 is configured such that the processor 102 is listening for data on bidirectional communication interface 114. If a credential 123 is placed in proximity to credential receiver 110 and no bidirectional communication has been detected, the processor controls output signal 128 to reconfigure switch 124 to utilize the unidirectional communication interface 108. The processor then communicates the credential data read by credential receiver 110 to the access controller 131 via the unidirectional (legacy) interface. Note, some embodiments may not include a switch, and in some embodiments, may instead couple the unidirectional lines and bidirectional lines in parallel to the processor 102.

If the processor 102 detects input data on the bidirectional communication interface, the processor performs the step of setting the electronic credential reader to a bidirectional mode, and subsequent communication to the access controller 131 utilizes bidirectional communication. The switch 124 is configured to use bidirectional communication interface 114 to communicate to the access controller 131. The input data can include a periodic heartbeat message or other data sent from the access controller 131. In embodiments, the periodic heartbeat messages may be transmitted at a rate ranging from once every 15 seconds to once every 25 seconds.

In some embodiments, electronic credential reader 100 may further include a one-time programmable (OTP) fuse 122. When a voltage from power supply 116 is applied to control signal 126, the fuse 122 is opened, thus permanently severing the link to the unidirectional communication interface. This enables embodiments that include severing the one-time programmable fuse upon detection of input data on the bidirectional interface 114. In these embodiments, once the electronic credential reader is put into bidirectional mode, the unidirectional communication interface is permanently disabled. This prevents a malicious actor from reverting the electronic credential reader 100 to the unidirectional (unsecure) mode of communication.

In some embodiments, once the electronic credential reader 100 detects input data on bidirectional communication interface 114, causing the electronic credential reader 100 to enter bidirectional mode, the processor 102 performs the step of recording the bidirectional mode in a non-volatile storage 106. In this way, if there is a power disruption, when power is restored, the processor 102 can check the previous communication mode based on data in non-volatile storage 106. If the previous mode was bidirectional mode, then the electronic credential reader 100 remains in bidirectional mode on the subsequent power-up. This prevents the electronic credential reader 100 from reverting to hunt mode upon power-up if the electronic credential reader 100 was in bidirectional mode prior to the power disruption. This is a security feature to prevent a malicious actor from taking the electronic credential reader 100 out of the secure bidirectional communication mode.

Figure 2:
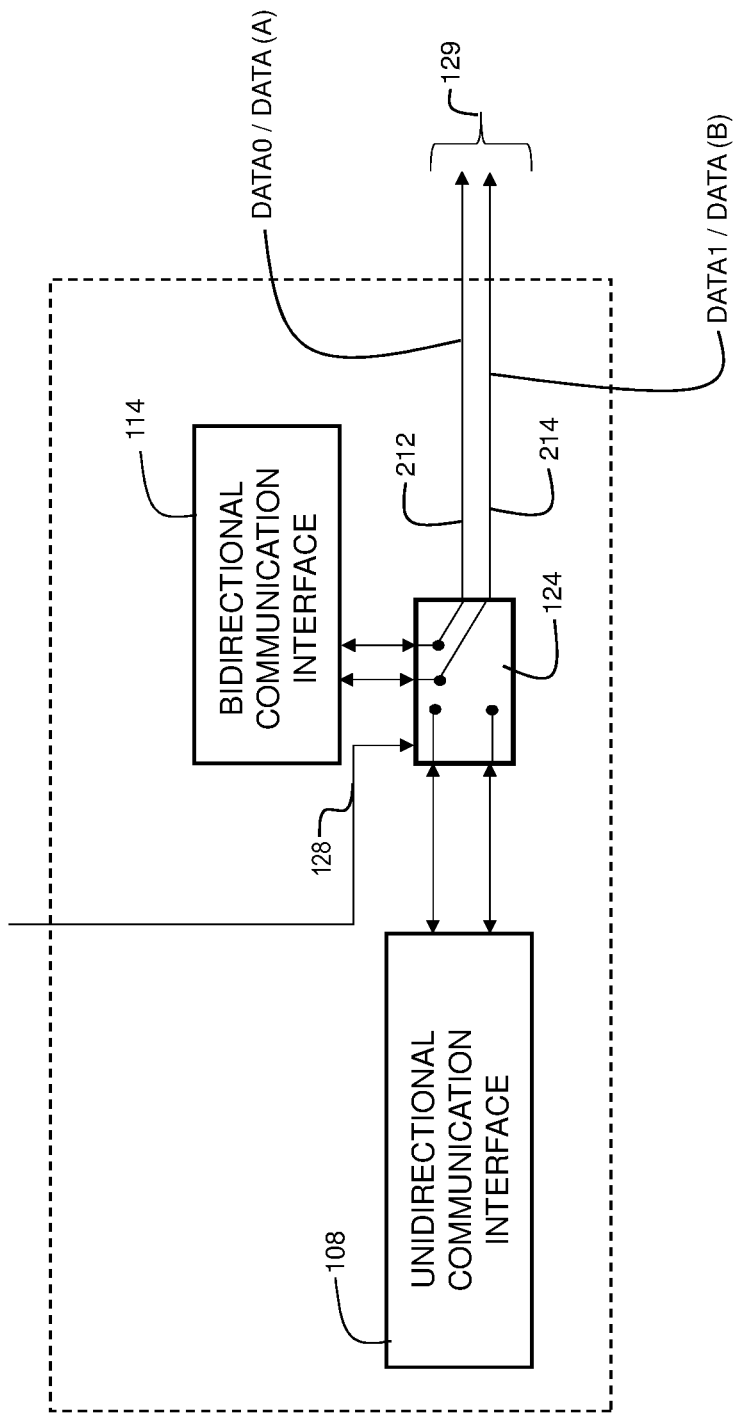
FIG. 2 shows additional details of the communication interfaces.

FIG. 2 shows additional details of the communication interfaces. In embodiments, the unidirectional communication interface 108 and the bidirectional communication interface 114 utilize two signal lines. In embodiments, external communication link 129 is comprised of a first signal line 212 and a second signal line 214. In embodiments, the unidirectional communication interface 108 comprises a Wiegand interface. Thus, in embodiments, the plurality of external communication lines comprises two communication lines.

The Wiegand interface is a 2-wire interface. To transmit credential information, a logical "0" is transmitted as a pulse on one wire, referred to as DATA0. Similarly, to transmit a logical "1", a pulse is generated on the other wire, referred to as DATA1. RS-485 has a variety of wiring modes, including a 2-wire mode. In a 2-wire RS-485 mode, there is a DATA (A) signal and a DATA (B) signal. Hence, in disclosed embodiments, the DATA0 and DATA1 signals in Wiegand mode share the DATA (A) and DATA (B) signals used in 2-wire RS-485 mode, for supporting the more secure Open Supervised Device Protocol (OSDP).

For example, in embodiments, external communication line 212 may serve as the DATA0 signal for unidirectional communication using Wiegand, and also serve as the DATA (A) signal for RS-485 mode of bidirectional communication. Similarly, external communication line 214 may serve as the DATA1 signal for unidirectional communication using Wiegand, and also serve as the DATA (B) signal for RS-485 mode of half-duplex bidirectional communication. These signal assignments are merely exemplary, and other combinations are possible, such as external communication line 212 serving as the DATA1 signal and/or DATA (B) signal, and so on.

The switch 124 connects the external communication link 129 to the unidirectional communication interface 108 or the bidirectional communication interface 114 based on the status of programmable output signal 128.

The bidirectional communication interface 114 may include one or more differential transmitter and receiver circuits. The unidirectional communication 108 may include pull-up circuitry to allow the external communication lines 212 and 214 to be at a nominal voltage (e.g. 5 Volts DC) when no data is being sent (when the switch 124 is configured for unidirectional communication). When data is being sent, one of the external communication lines is momentarily pulled low to signify a logical 0 or logical 1.

The external communication link 129 connects to an access controller (e.g. 131) of FIG. 1. Thus, when the access controller switches modes (e.g. from unidirectional communication mode to bidirectional communication mode) no wiring changes are needed, since the bidirectional communication interface 114 and the unidirectional communication interface 108 are configured to share the plurality of external communication lines 212 and 214.

Figure 3:
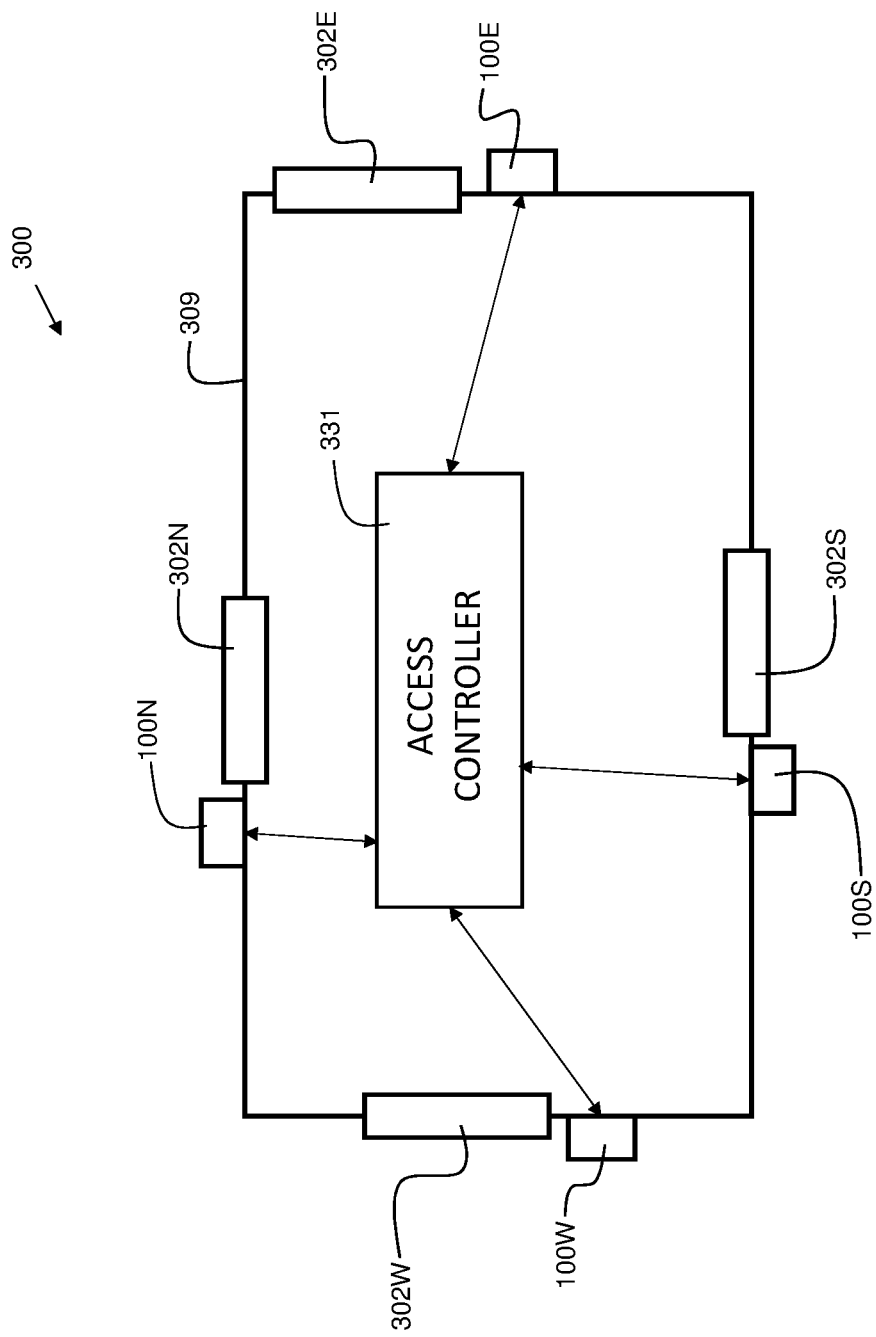
FIG. 3 shows a system utilizing an electronic credential reader in accordance with embodiments of the present invention.

FIG. 3 shows a system 300 utilizing an electronic credential reader in accordance with embodiments of the present invention. In embodiments, multiple electronic credential readers may communicate with a single access controller 331. As shown in FIG. 3, there is a premises 309, that utilizes four electronic credential readers, indicated as 100W, 100N, 100E, and 100S. Electronic credential reader 100N corresponds to north entrance 302N, electronic credential reader 100E corresponds to east entrance 302E, electronic credential reader 100S corresponds to south entrance 302S, and electronic credential reader 100W corresponds to west entrance 302W.

In an example usage, legacy electronic credential readers may each be replaced with an electronic credential reader in accordance with embodiments of the present invention. These electronic credential readers operate in unidirectional (Wiegand) mode until the access controller 331 is upgraded to support a bidirectional communication protocol. Later, the access controller 331 is replaced or upgraded to provide bidirectional communication via OSDP or other suitable protocol. Each of the electronic credential readers 100N, 100E, 100W, and 100S receives input data on its corresponding bidirectional communication interface from access controller 331, and subsequently switches to a bidirectional mode upon detecting input data.

In some embodiments, the switching of the electronic credential reader from unidirectional mode to bidirectional mode may be done at the electronic credential reader after installation. In some embodiments, a special credential can be used to switch the communication mode. For example, an installer can have a special credential that when presented to the electronic credential reader, causes the electronic credential reader to transition to bidirectional communication mode. In embodiments, the special credential is a "Prox" (125 kHz) and/or Smart or NFC (13.56 MHz) card with a predetermined numeric value encoded into it. When the processor (102 of FIG. 1) detects this value, it sets programmable output signal 128 accordingly to configure switch 124 to enable the bidirectional communication interface 114. In this way, an installer can precisely control when each electronic credential reader transitions to bidirectional communication mode.

Figure 4:
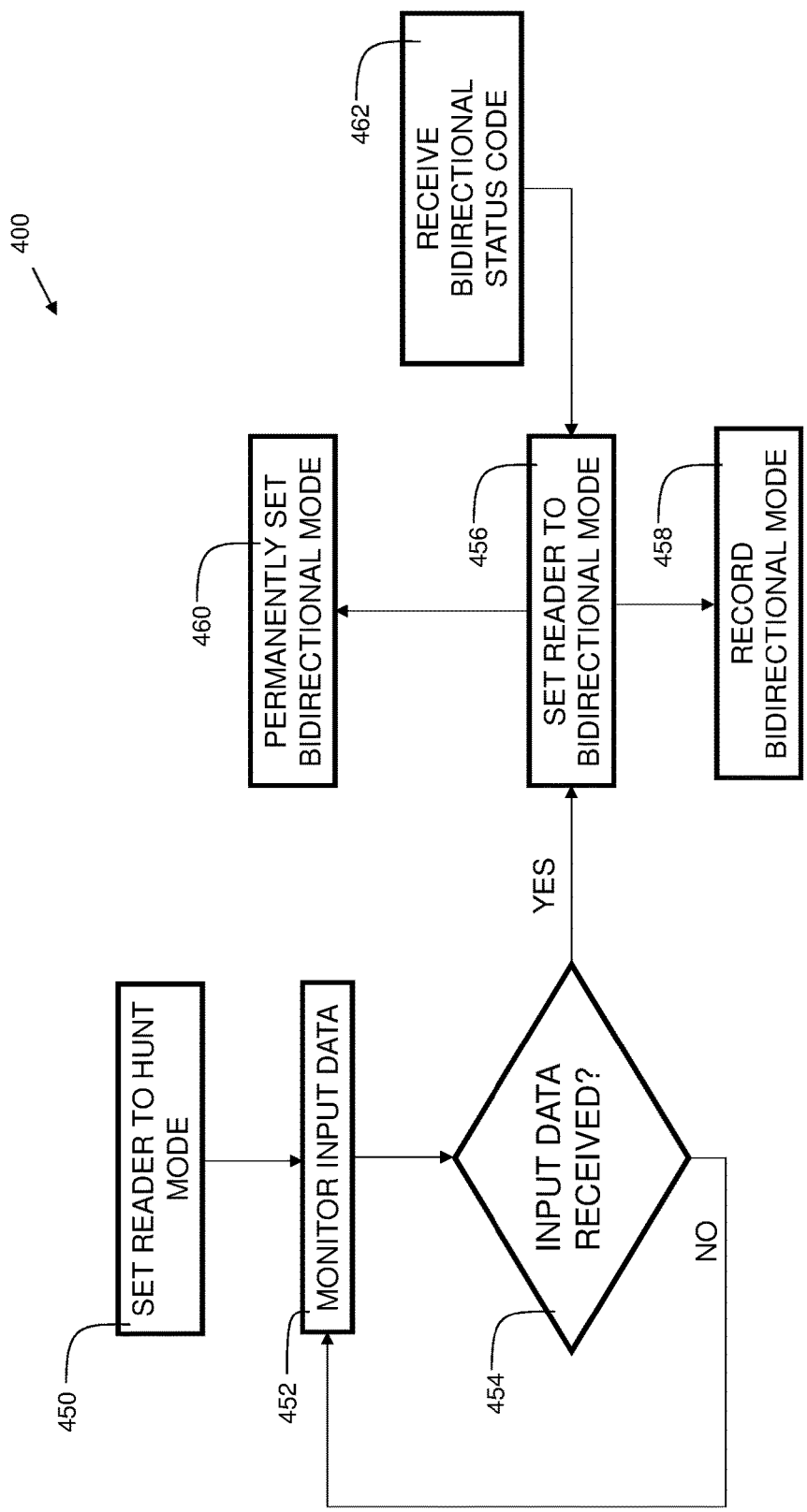
FIG. 4 is a flowchart indicating process steps for embodiments of the present invention.

FIG. 4 is a flowchart 400 indicating process steps for embodiments of the present invention. At process step 450, the electronic credential reader is set to hunt mode. In embodiments, hunt mode is the default mode of operation. At process step 452, in hunt mode, the electronic credential reader is monitoring the bidirectional communication interface for any input data (e.g. RS-485 data). At process step 454, a check is made to see if input data has been received on the bidirectional communication interface. In the absence of any received input data on the bidirectional communication interface, the electronic credential reader communicates any credential data (e.g. from a user presenting a credential) via the unidirectional communication interface, and the process returns to process step 452. This may include temporarily changing the configuration of switch 124 (FIG. 1) to allow the credential data (e.g. from a swiped card) to be sent via the unidirectional communication interface. Once the credential data is sent, the processor 102 reconfigures switch 124 to enable the bidirectional communication interface to resume the monitoring of input data. If, at process step 454 input data is received, the process continues to process step 456 where the electronic credential reader is set to bidirectional communication mode. This can include configuring switch 124 to connect the external communication link 129 to the bidirectional communication interface 114. Embodiments may further include process step 458 of recording the status of the bidirectional mode in non-volatile storage 106. In some embodiments, the process may proceed to process step 460 where the electronic credential reader is permanently set to bidirectional communication mode. In embodiments, the permanent setting is performed by blowing (severing) a one-time programmable (OTP) fuse (122 of FIG. 1). Thus, embodiments include permanently disconnecting the unidirectional communication interface upon setting the electronic credential receiver to the bidirectional mode.

In some embodiments, the process can originate from process step 462, where a bidirectional status code is received by the electronic credential reader, which causes the electronic credential reader to enter bidirectional communication mode. In these embodiments, an installer or other qualified person can set the electronic credential reader in bidirectional communication mode by providing the credential which includes the bidirectional status code. In embodiments, this credential is a "Prox" (125 kHz) and/or Smart or NFC (13.56 MHz) card with a predetermined numeric value corresponding to a special instruction to switch to the bidirectional communication mode. In some embodiments, multiple bidirectional status codes can be used. As an example, a first bidirectional status code can cause the process to proceed to process step 456, while a second bidirectional status code can cause the process to proceed to process step 456, followed by process step 460. In an example usage, an installer may present a credential containing the first bidirectional status code while testing the installation of the access control system. The installer may present another credential containing a status code to allow the system to revert to hunt mode until all the equipment is present and any other conditions are met for permanently setting the system to bidirectional mode. Once the system is confirmed to be operational, the installer may then present another credential containing the second bidirectional status code to permanently set the bidirectional communication mode (e.g. by blowing the OTP fuse 122).

Figure 5:
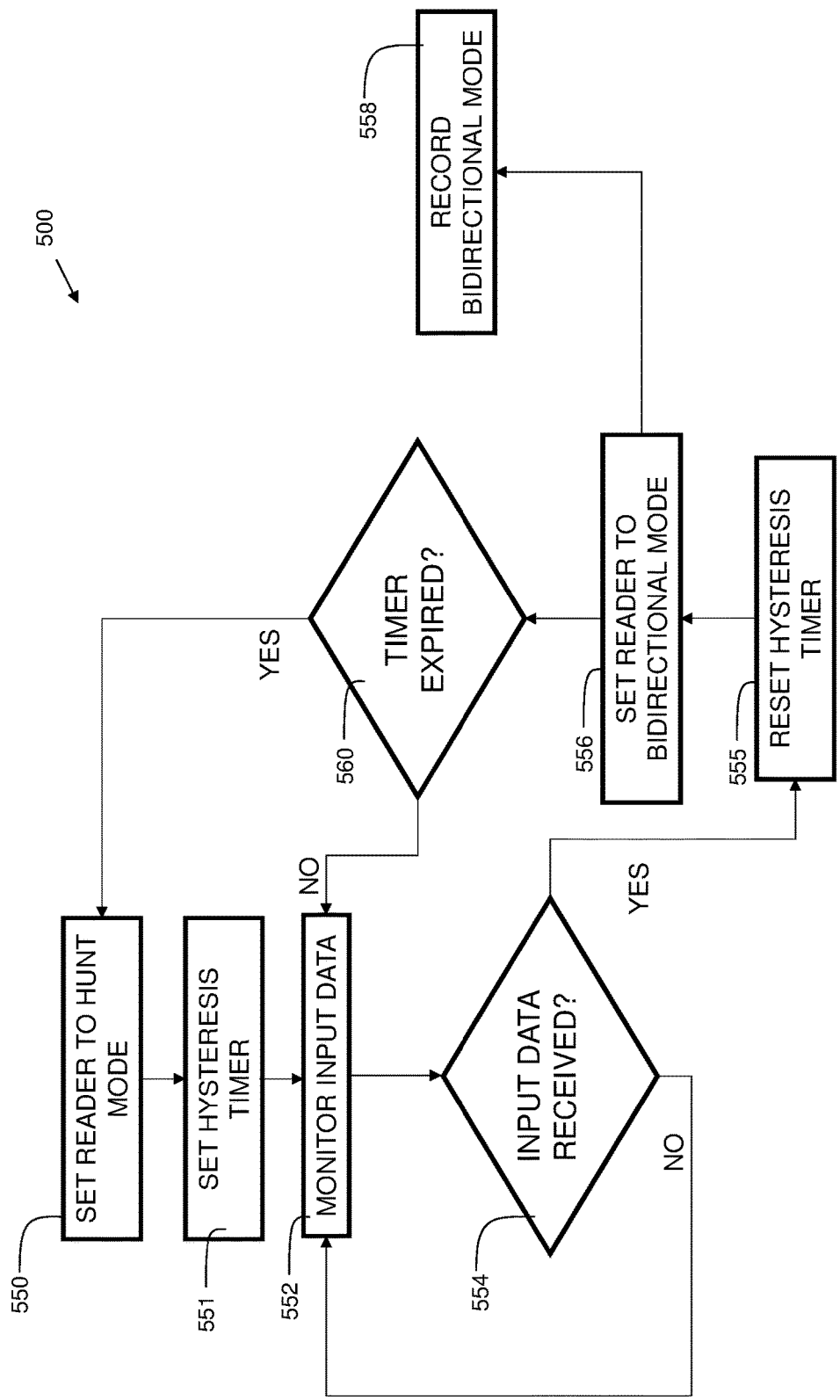
FIG. 5 is a flowchart indicating process steps for an alternative embodiment of the present invention.

FIG. 5 is a flowchart 500 indicating process steps for an alternative embodiment of the present invention. At process step 550, the electronic credential reader is set to hunt mode. At process step 551, a hysteresis timer is set. The hysteresis timer is reset when input data is received on the bidirectional communication interface. In embodiments, the hysteresis timer may be implemented with dedicated hardware. In other embodiments, the hysteresis timer may be implemented via software executing on the processor (102 of FIG. 1). If the hysteresis timer expires, the electronic credential reader reverts to hunt mode, where credential data is sent via the unidirectional interface. At process step 552, in hunt mode, the electronic credential reader is monitoring the bidirectional communication interface for any input data (e.g. RS-485 data). At process step 554, a check is made to see if input data has been received on the bidirectional communication interface. In the absence of any data, the electronic credential reader communicates any credential data via the unidirectional communication interface, and the process returns to process step 552. This may include temporarily changing the configuration of switch 124 (FIG. 1) to allow the credential data (e.g. from a swiped card) to be sent via the unidirectional communication interface. Once the credential data is sent, the processor 102 reconfigures switch 124 to enable the bidirectional communication interface to resume the monitoring of input data. If, at process step 554 input data is received, the process continues to process step 555 where the hysteresis timer is reset. The process then proceeds to process step 556 where the electronic credential reader is set to bidirectional communication mode. This can include configuring switch 124 to connect the external communication link 129 to the bidirectional communication interface 114. Embodiments may further include process step 558 of recording the bidirectional mode in non-volatile storage 106. At process step 560 a check is made to see if the hysteresis timer has expired. If no, the process continues to process step 552. If the timer has expired, the process returns to process step 550, and the electronic credential reader is set to hunt mode. Thus, embodiments include resetting the timer upon reception of a bidirectional message, and reverting the electronic credential receiver to a hunt mode upon expiry of the hysteresis timer. With these embodiments, the electronic credential reader reverts to hunt mode if no bidirectional data is detected after a predetermined time period. This mode may be useful for testing purposes. In embodiments, the predetermined time period ranges from 30 seconds to 60 seconds. Another application of this embodiment is where an access controller that supports bidirectional communication needs to be temporarily swapped with a legacy access controller that only supports unidirectional communication. In such a case, with the embodiments described in FIG. 5, the electronic credential reader reverts to unidirectional (e.g. Wiegand) mode to allow the access control system to continue to function during this time.

As can now be appreciated, disclosed embodiments provide an electronic credential reader with improved configurability which enables a more seamless transition between legacy communication protocols and newer, more secure, bidirectional communication protocols. This greatly simplifies logistics when transitioning from legacy protocols to newer, more secure protocols such as OSDP. Note that while embodiments described herein utilize examples of Wiegand for unidirectional communication and OSDP/RS-485 for bidirectional communication, other communication protocols may be used in embodiments of the present invention.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An electronic credential reader, comprising:
   a credential receiver;
   a unidirectional communication interface;
   a bidirectional communication interface;
   a plurality of external communication lines, wherein the unidirectional communication interface and the bidirectional interface are coupled to a processor via the external communication lines; and
   a computer readable medium coupled to the processor;
   wherein the bidirectional communication interface and the unidirectional communication interface are configured to share the plurality of external communication lines; and
   wherein the computer readable medium comprises instructions that, when executed by the processor, change
      from a first communication mode in which the electronic credential reader uses the unidirectional communication interface to communicate with the processor via the external communication lines
      to a second communication mode in which the electronic credential reader uses the bidirectional communication interface to communicate with the processor via the external communication lines.

2. The electronic credential reader of claim 1, wherein the bidirectional communication interface comprises an RS-485 interface.

3. An electronic credential reader, comprising:
   a credential receiver;
   a unidirectional communication interface;
   a bidirectional communication interface;
   a plurality of external communication lines;
   a switch configured to selectively couple the unidirectional communication interface and the bidirectional communication interface to the plurality of external communication lines;
   a processor coupled via the plurality of external communication lines to the switch, for the processor to communicate with the unidirectional communication interface and bidirectional communication interface through both the plurality of external communication lines and the switch; and
   a computer readable medium coupled to the processor;
   wherein the bidirectional communication interface and the unidirectional communication interface are configured to share the plurality of external communication lines; and
   wherein the computer readable medium comprises instructions that, when executed by the processor, control the switch to change from
      a first communication mode in which the electronic credential reader uses the unidirectional communication interface to communicate with the processor via the external communication lines to a second communication mode in which the credential reader uses the bidirectional communication interface to communicate with the processor via the external communication lines.

4. The electronic credential reader of claim 3, wherein the unidirectional communication interface comprises an output interface.

5. The electronic credential reader of claim 3, wherein the bidirectional communication interface comprises an RS-485 interface.

6. The electronic credential reader of claim 3, wherein the plurality of external communication lines comprises two communication lines.

7. The electronic credential reader of claim 6, wherein the two communication lines comprises a DATA0 line and a DATA1 line.

8. The electronic credential reader of claim 7, wherein the two communication lines further comprise a RS-485 DATA (A) line and a RS-485 DATA (B) line.

9. The electronic credential reader of claim 8, wherein the two communication lines are configured and disposed to implement an Open Supervised Device Protocol (OSDP) interface.

10. The electronic credential reader of claim 3, wherein the computer readable medium further contains instructions, that when executed by the processor, perform the steps of:
   monitoring the bidirectional communication interface for input data;
   setting the electronic credential reader to a bidirectional mode upon detecting input data; and
   recording a status of the bidirectional mode in a non-volatile storage.

11. An electronic credential reader, comprising:
   a credential receiver;
   a unidirectional communication interface;
   a bidirectional communication interface;
   a plurality of external communication lines, wherein the bidirectional communication interface and the unidirectional communication interface are configured to share the plurality of external communication lines;
   a switch coupled to the unidirectional communication interface, the bidirectional communication interface, and the plurality of external communication lines;
   a processor coupled to the switch;
   a computer readable medium coupled to the processor; and
   a one-time programmable fuse disposed between the unidirectional communication interface and the processor;

wherein the computer readable medium contains instructions that, when executed by the processor, perform the steps of:
   monitoring the bidirectional communication interface for input data;
   severing the one-time programmable fuse upon detection of input data; and
   changing a communication mode of the electronic credential reader from a unidirectional mode to a bidirectional mode.

12. An electronic credential reader, comprising:
   a credential receiver;
   a unidirectional communication interface;
   a bidirectional communication interface;
   a plurality of external communication lines;
   a switch coupled to the unidirectional communication interface, the bidirectional communication interface, and the plurality of external communication lines;
   a processor coupled to the switch;
   a computer readable medium coupled to the processor; and
   wherein the bidirectional communication interface and the unidirectional communication interface are configured to share the plurality of external communication lines; and
   wherein the computer readable medium contains instructions, that when executed by the processor, perform the steps of:
      monitoring the credential receiver for a bidirectional status code;
      changing a communication mode of the electronic credential reader from a unidirectional mode to a bidirectional mode by setting the electronic credential reader to the bidirectional mode upon detecting the bidirectional status code; and
      recording the bidirectional mode in a non-volatile storage.

13. An electronic credential reader, comprising:
   a credential receiver;
   a unidirectional communication interface;
   a bidirectional communication interface;
   a plurality of external communication lines;
   a switch coupled to the unidirectional communication interface, the bidirectional communication interface, and the plurality of external communication lines;
   a processor coupled to the switch;
   a computer readable medium coupled to the processor;
   wherein the bidirectional communication interface and the unidirectional communication interface are configured to share the plurality of external communication lines, and;
   wherein the computer readable medium comprises instructions, that when executed by the processor, perform the steps of:
      changing a communication mode of the electronic credential reader from a unidirectional mode to a bidirectional mode;
      monitoring the bidirectional communication interface for input data;
      setting the electronic credential reader to a bidirectional mode upon detecting input data;
      recording a status of the bidirectional mode in a non-volatile storage;
      establishing a hysteresis timer;
      resetting the hysteresis timer upon reception of a bidirectional message; and
      reverting the electronic credential reader to a hunt mode upon expiry of the hysteresis timer.

14. A computer-implemented method for configuring an electronic credential reader, comprising:
   initializing the electronic credential reader in a unidirectional communication mode;
   transmitting received credential information from the electronic credential reader to a processor via a unidirectional communication interface while in the unidirectional communication mode;
   monitoring a bidirectional communication interface for input data; and
   setting the electronic credential reader, upon detecting input data on the bidirectional communication interface, from the unidirectional communication mode to a bidirectional communication mode in which any further received credential information is transmitted from the electronic credential reader to the processor via a bidirectional communication interface.

15. A computer-implemented method for configuring an electronic credential reader, comprising:
   initializing the electronic credential reader in a hunt mode;
   transmitting received credential information via a unidirectional communication interface while in hunt mode;
   monitoring a bidirectional communication interface for input data; and
   setting the electronic credential reader to a bidirectional mode upon detecting input data on the bidirectional communication interface; and
   recording a bidirectional mode status in a non-volatile storage.

16. The method of claim 15, further comprising reverting to the hunt mode upon detection of a reset message on the bidirectional communication interface.

17. The method of claim 15, further comprising reverting to the hunt mode upon detection of a status code from a credential.

18. The method of claim 15, further comprising permanently disconnecting the unidirectional communication interface upon setting the electronic credential reader to the bidirectional mode.

19. The method of claim 18, wherein permanently disconnecting the unidirectional communication interface comprises blowing a one-time programmable fuse.

20. The method of claim 15, further comprising reverting to the hunt mode upon expiry of a hysteresis timer.

* * * * *